Nov. 6, 1928.
P. M. GELATT
1,690,575
MOUNTING FOR INDICATING INSTRUMENTS FOR AUTOMOBILES
Filed Nov. 19, 1923   2 Sheets-Sheet 2
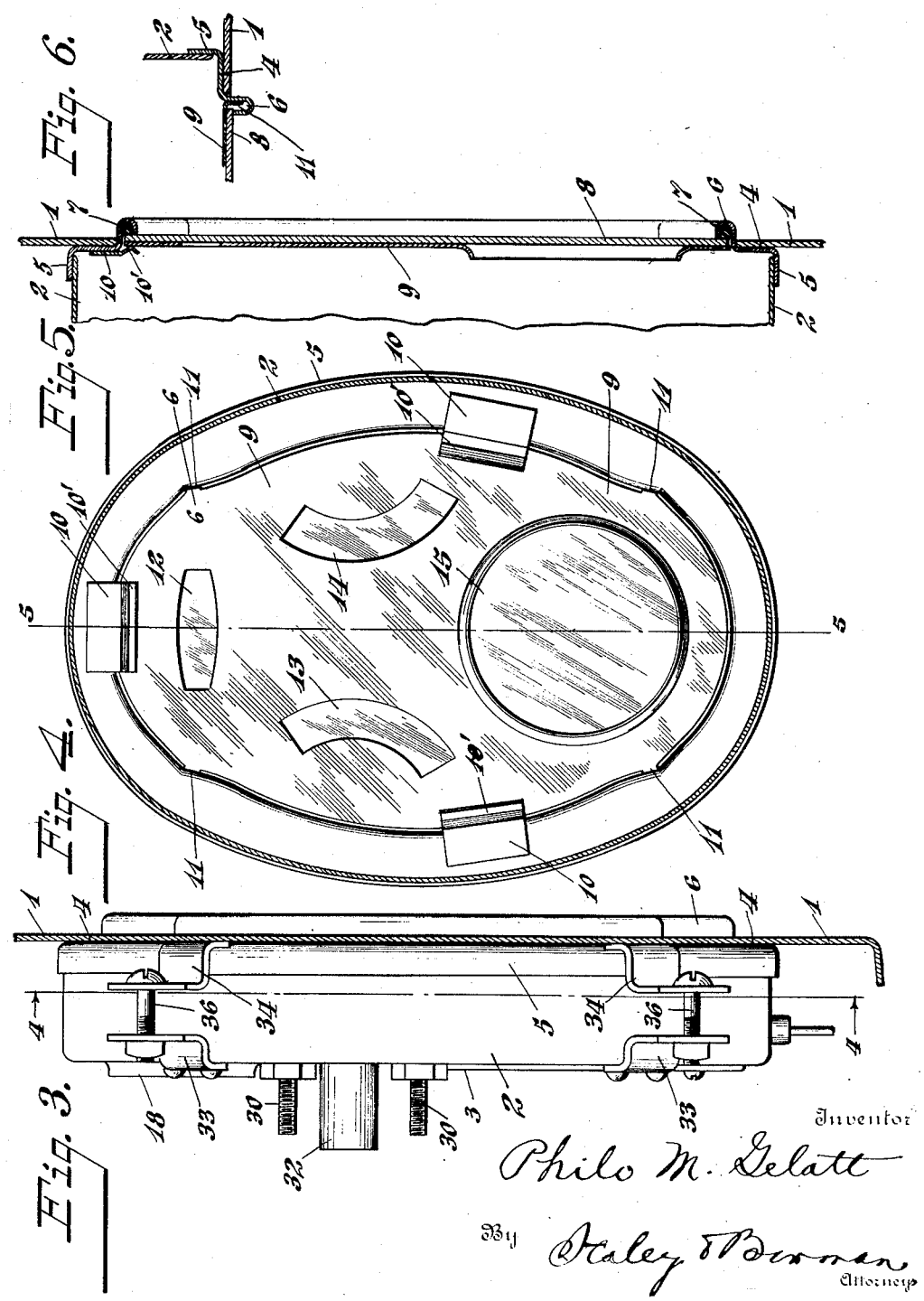

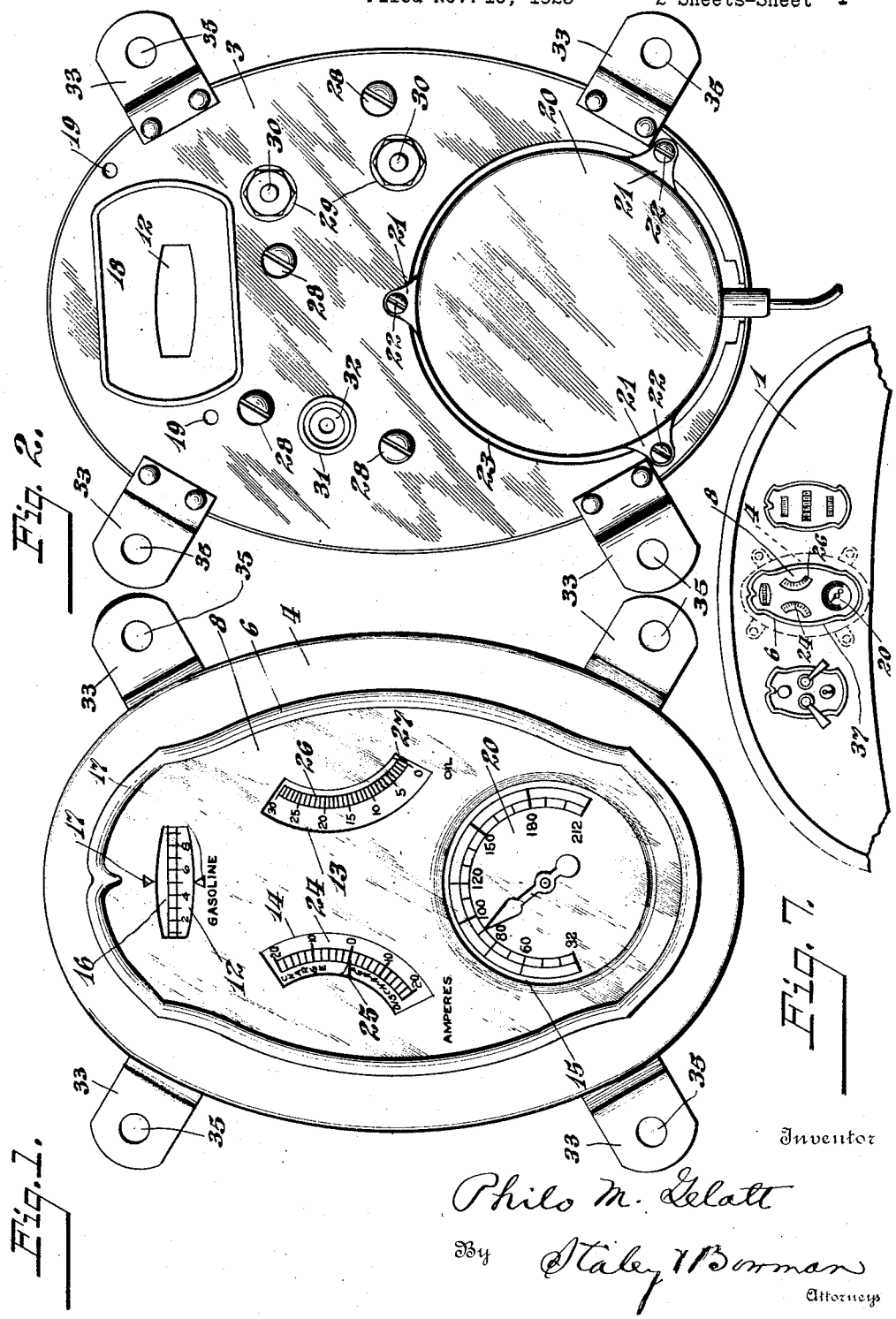

Patented Nov. 6, 1928.

1,690,575

UNITED STATES PATENT OFFICE.

PHILO M. GELATT, OF LA CROSSE, WISCONSIN, ASSIGNOR, BY MESNE ASSIGNMENTS, TO NATIONAL GAUGE & EQUIPMENT COMPANY, OF WILMINGTON, DELAWARE, A CORPORATION OF DELAWARE.

MOUNTING FOR INDICATING INSTRUMENTS FOR AUTOMOBILES.

Application filed November 19, 1923. Serial No. 675,640.

My invention relates to a mounting for the indicating instruments of automobiles, it particularly relating to a mounting which is associated with and supported by the instrument board.

The object of my invention is to provide for assembling certain of the indicating instruments, such for instance as the ammeter, oil and gas gauges, and temperature indicator, in a single unit, which can be conveniently mounted upon the instrument board of an automobile thereby to simplify the work of installation of the instruments as well as to enable the manufacturer of the instruments to assemble the same in a more compact, convenient, attractive and economical form.

Further objects of the invention will appear from the accompanying description and claims.

In the accompanying drawings:

Fig. 1 is a front elevation of the improved mounting.

Fig. 2 is a rear elevation of the same with the gasoline indicator removed.

Fig. 3 is a side elevation.

Fig. 4 is a section on the line 4—4 of Fig. 3.

Fig. 5 is a section on the line 5—5 of Fig. 4.

Fig. 6 is a section on the line 6—6 of Fig. 4.

Fig. 7 is an elevation of the face of an instrument board showing the improved mounting assembled thereon.

Referring to the drawings, 1 represents an instrument board of any suitable construction, the particular one shown in the drawings being formed of sheet metal which is connected with and supported by the dash board and body in the usual manner. In constructing the mounting there is employed a sheet metal casing 2 preferably of elliptical or oval shape when viewed from the front or rear, this casing having an integrally-formed partly closed back 3 at the rear thereof and an open rim 4 partly enclosing the forward side thereof. The rim 4 has an outer peripheral flange 5 which is pressed onto the walls of the casing 2 with a tight fit and also has its inner edge extended forwardly and shaped to provide a channel 6 which receives a packing ring 7 against which is seated a transparent window 8 preferably of glass. This glass window is held in position by a plate 9 which in turn is pressed against the glass window by a series of three sheet metal lugs 10 which are soldered or otherwise secured to the inner face of the rim 4 and have their inner edges bent to a V-form as indicated at 10' in Fig. 5, which V-shaped edges are bent forwardly so as to impinge tightly against the inner side of the plate 9. The plate 9 is also more securely anchored in position by providing it with a series of forwardly-extending ears 11 which are projected into the channel 6 as shown in Figs. 4 and 6. By bending the edges 10' of the securing pieces 10 rearwardly the plate 9 together with the glass 8 may be removed when desired.

The plate 9 in the present case is provided with a series of windows 12, 13, 14 and 15. The window 12 is centrally located at the top of the plate and is elongated transversely and is intended to expose the rotary indicating dial 16 of a gasoline gauge of any suitable construction, which dial cooperates with the stationary indications 17. This gauge is inserted through the opening 18 formed in the back wall 3 of the main casing and secured to said back wall by suitable fastening devices such as screws which may be received in the openings 19. The opening 15 is preferably circular in form and is located in the lower portion of the plate 9 centrally as to width and is designed to expose the forward side including the dial and pointer of an indicating instrument 20, such as a temperature indicator, although if it is desired a clock may be installed at this point. Fig. 2 shows the manner of securing this instrument in position, it being provided with ears 21 which are secured by screws 22 to the rear wall 3 of the casing which has a circular opening 23 to receive the instrument. The two openings 13 and 14 are between the openings 12 and 15 on each side of the vertical center line of the plate 9 and the side walls of these openings are formed on the arcs of circles of lengths a little greater than the extent of movement of the indicating hands of the instruments which are associated therewith. The opening 14 exposes the dial 24 and indicating pointer 25 of an ammeter while the opening 13 exposes the dial 26 and pointer 27 of an oil gauge. Screws 28 serve to secure the ammeter and oil gauge to the back wall 3 of the casing. The back wall 3 has openings 29 to receive the binding posts 30 of the ammeter and it also has an opening 31 to receive the connection 32 of the oil gauge to which the oil pipe (not shown) is secured. In assembling the structure, the instruments are secured to the back wall 3 of the casing before the rim 4 is pressed onto the casing; the glass covering 8 and plate 9 having been secured in position on the rim before the rim is applied.

For the purpose of securing this mounting to the instrument board 1 there is riveted or otherwise secured to the rear wall 3 a series of sheet metal lugs 33, and the rear side of the instrument board has also secured thereto in any suitable way similar lugs 34 in line with the lugs 33, all of these lugs being provided with apertures 35 to receive bolts 36 whereby the rim 4 may be clamped against the rear face of the instrument board. The instrument board has an opening 37 of a size to snugly receive the outer periphery of the channel 6, the mounting being inserted from the rear of the instrument board.

From the foregoing description it will be seen that an arrangement is provided whereby a plurality of indicating instruments may be assembled in a very compact, attractive and economical manner by the manufacturer of those instruments and thereafter readily installed upon the instrument board of an automobile.

Further, by the arrangement described it will be noted th t the glass or other transparent covering for the instrument casing is substantially flush with the instrument board and that but a very small portion of the instrument mounting projects on the forward side of the board, that portion being the channel 6 which constitutes a bead-like structure on the inner periphery of the rim 4.

Having thus described my invention, I claim:

1. In an instrument mounting for an automobile instrument board, a casing having a closed back with a plurality of perforations for bearings and an open forward end, a rim member secured to said open end having an inner forwardly extending edge, an insertable dial plate member, and an insertable transparent member, securing devices for removably clamping said insertable members against said inner edge of said rim member, the said inner edge of said rim member being inserted through an opening formed in said instrument board, and means for clamping said casing against the instrument board whereby the rim member will be held against the inner face of the board with the inner edge thereof projecting beyond said board.

2. An instrument mounting for an automobile instrument board consisting of a casing having a closed back and an open forward end with a plurality of perforations for bearings formed in said casing, a rim member secured to the open end of said casing having a forwardly projecting inner edge extending through an opening formed in said instrument board, the intermediate portion of said rim member being substantially flat, an insertable transparent member and an insertable dial plate member; means for removably securing said members against the inner edge portion of said rim, thereby forming a unitary transportable device, and means for clamping the intermediate portion of said rim against the inner face of said instrument board with the inner edge portion thereof projecting beyond the outer face of said instrument board.

3. In an instrument mounting, a casing having a closed back and an open forward end, a rim member secured to said open end having an inner forwardly extending edge provided with a returned bent portion to form a channel, packing material in said channel, an insertable dial plate member and an insertable transparent member, securing devices for removably clamping said insertable members against said packing the said channel portion of said rim member being inserted through an opening formed in said instrument board, and means for clamping said casing against the instrument board whereby the rim member will be held against the inner face of said instrument board with the channel portion thereof projecting through said opening.

In testimony whereof, I have hereunto set my hand this ninth day of November, 1923.

PHILO M. GELATT.